(12) United States Patent
Nakayama et al.

(10) Patent No.: US 6,809,053 B2
(45) Date of Patent: Oct. 26, 2004

(54) METHOD FOR REACTIVATING SULFONATED RESIN CATALYST

(75) Inventors: Hiroshi Nakayama, Annaka (JP); Masao Maruyama, Annaka (JP); Hiromi Nakabayashi, Annaka (JP); Susumu Ueno, Takefu (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 10/448,102

(22) Filed: May 30, 2003

(65) Prior Publication Data
US 2003/0224925 A1 Dec. 4, 2003

(30) Foreign Application Priority Data
May 31, 2002 (JP) .......................... 2002-159209

(51) Int. Cl.⁷ .............................. B01J 38/68; B01J 31/10
(52) U.S. Cl. ............................ 502/24; 502/159; 502/168
(58) Field of Search ........................ 502/24, 159, 168

(56) References Cited

U.S. PATENT DOCUMENTS

| | | | |
|---|---|---|---|
| 2,992,189 A | | 7/1961 | Friedman et al. ............ 252/413 |
| 3,694,405 A | | 9/1972 | Litteral .................. 260/46.5 R |
| 3,903,047 A | | 9/1975 | Ashby .................... 260/46.5 R |
| 4,222,952 A | * | 9/1980 | Vick ......................... 556/462 |
| 4,426,508 A | | 1/1984 | Dromard et al. .............. 528/83 |
| 4,508,845 A | | 4/1985 | Dromard et al. ............ 502/159 |
| 5,428,075 A | | 6/1995 | Pressman et al. ............. 521/26 |

FOREIGN PATENT DOCUMENTS

| | | |
|---|---|---|
| JP | 47-8646 | 5/1972 |
| JP | 50-133299 | 10/1975 |
| JP | 58-21427 | 2/1983 |

* cited by examiner

Primary Examiner—Stanley S. Silverman
Assistant Examiner—Jonas N. Strickland
(74) Attorney, Agent, or Firm—Birch, Stewart, Kolasch & Birch, LLP

(57) ABSTRACT

A sulfonated resin catalyst whose activity has lowered as a result of use in the polymerization of silicone oil is reactivated by washing the catalyst with a low molecular weight siloxane medium, volatilizing off the siloxane medium under atmospheric or reduced pressure, and removing water from the catalyst.

5 Claims, 1 Drawing Sheet

METHOD FOR REACTIVATING SULFONATED RESIN CATALYST

This nonprovisional application claims priority under 35 U.S.C. §119(a) on Patent Application No(s). 2002-159209 filed in JAPAN on May 31, 2002, which is (are) herein incorporated by reference.

TECHNICAL FIELD

This invention relates to a method for reactivating a sulfonated resin catalyst for use in the polymerization of silicone oil, and more particularly, to a method for reactivating to a reusable level a sulfonated resin catalyst which has been used in the polymerization of silicone oil whereby the activity has been lowered due to adsorption of condensation water and clogging of micropores with gel and viscous materials.

BACKGROUND OF THE INVENTION

Silicone oils are generally of a linear organosiloxane structure. Dimethylpolysiloxane oil on common use has a degree of polymerization of about 2 to about 2,100 and a viscosity of about 0.65 to about 1,000,000 centistokes (cs) at 25° C. Silicone oils are produced by a variety of methods. In industrial plants, they are often produced by equilibration reaction of a raw material mixture containing a corresponding linear low molecular weight polymer, low molecular weight cyclics and end groups or a mixture of low and high molecular weight polymers in the presence of an acid or alkali catalyst. Typical silicone oils include dimethylsilicone oil of a dimethylpolysiloxane structure and methylphenylsilicone oil containing several to several ten moles of phenyl groups. They are widely used in the industry as heat resistant oil, cosmetic materials and parting agents.

In recent years, solid catalysts, especially solid acid catalysts become of interest from the standpoints of productivity improvement, product purity improvement and waste reduction, and have already been used.

Solid acid catalysts are used in several ways. In one exemplary way, the solid acid catalyst is set as a stationary phase in a continuous flowpath to enable a continuous production process, eliminating a catalyst removal procedure including neutralization, water washing and separation which is required in the prior art. In another simple way of usage, the solid acid catalyst is dispersed in a reaction solution by agitation, and after the completion of reaction, fractionated and removed using a screen or the like.

However, the solid acid catalysts reach the end of life due to a loss of catalysis over time, increased impurities in the product, an increased drive pressure through a continuous unit and the like, and are discarded after the expiration. It is desired to prolong the life of catalysts or to reactivate the used catalysts.

The method of producing silicone oil using solid acid catalysts is disclosed in JP-A 47-8646, JP-A 50-133299, JP-A 58-21427, etc. These patents describe nowhere the life of catalysts and the reactivation of used catalysts. In the literature, no reference has been made to the life of catalysts and the reactivation of used catalysts. These are technical problems to be solved before solid acid catalysts can be used in the industry.

SUMMARY OF THE INVENTION

An object of the present invention is to provide a method for reactivating a sulfonated resin catalyst for prolonging the catalyst life.

The inventors have found that a sulfonated resin catalyst which has been used in the polymerization of silicone oil whereby the activity has been lowered can be reactivated by washing the used catalyst (containing water) with a low molecular weight siloxane medium, volatilizing off the siloxane medium under atmospheric or reduced pressure, and removing water from the catalyst. With this method, the catalyst is effectively reactivated so that the service life thereof is prolonged.

One cause of catalyst deactivation is water. A trace amount of water is contained in the starting siloxane. Water forms through condensation of hydroxyl groups at ends of the starting low molecular weight siloxane polymer. It is believed that these water contents are adsorbed and deposited to surfaces of the catalyst and carrier resin. An attempt was made to dehydrate and dry the catalyst. However, the dehydrating/drying treatment alone was insufficient for complete reactivation of the catalyst.

Another cause of catalyst deactivation is thought to be the deposition of gel resulting from decomposition of siloxane organic groups by the strong acid catalyst and the deposition of foreign matter. An attempt was made to wash catalyst surfaces with a low molecular weight siloxane medium which is a low polymeric fraction of silicone oil. The washing alone failed to achieve complete reactivation of the catalyst, but when combined with the dehydrating/drying treatment, forwarded the catalyst reactivation to a reusable level.

Through these experiments, the inventors have found that a combination of low molecular weight siloxane medium washing with water removal, applied to a used solid acid catalyst, achieves a synergistic effect of reactivating the catalyst to an acceptable level.

Accordingly, the present invention provides a method for reactivating a sulfonated resin catalyst which has been used in the polymerization of silicone oil whereby the activity has been lowered, comprising the steps of washing the used catalyst with a low molecular weight siloxane medium, volatilizing off the siloxane medium under atmospheric or reduced pressure, and removing water from the catalyst.

DESCRIPTION OF THE PREFERRED EMBODIMENTS

Figure 1:
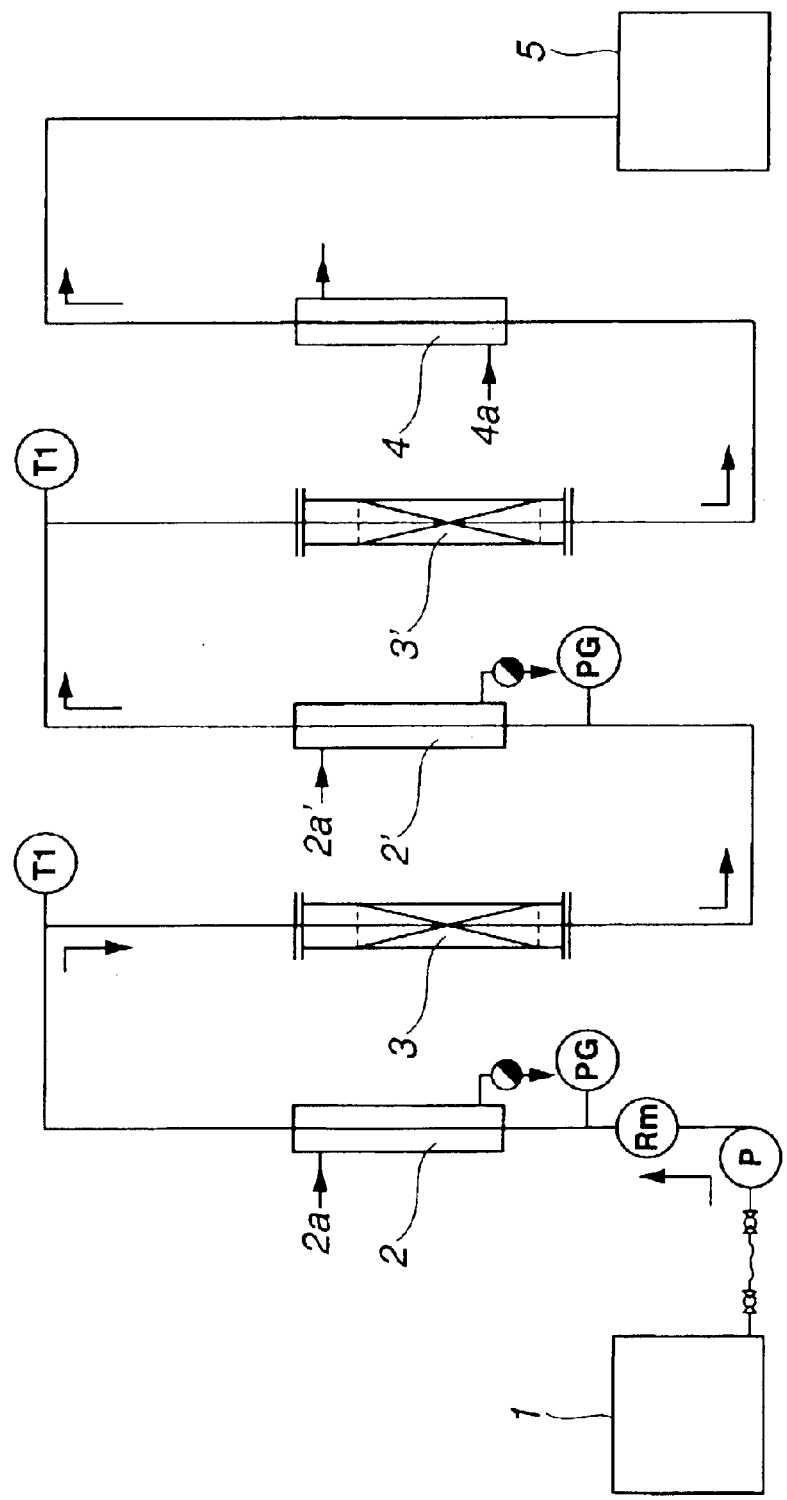
FIG. 1 is a flow chart of a continuous polymerization system used in Example.

The present invention aims to reactivate a sulfonated resin catalyst whose activity has lowered as a result of use in the polymerization of silicone oil. The sulfonated resin catalyst of interest in the present invention is not critical as long as it is a solid acid catalyst for use in the polymerization of silicone oil. Exemplary sulfonated resins used as the solid acid catalyst are granular resins having sulfonic acid groups as functional groups on pore surfaces, such as Amberlyst dry type by Rohm & Haas Co. and CT-169 in dried form by Purolite Co.

The silicone oil to be polymerized is not critical. For example, a silicone oil is obtained by subjecting a low molecular weight cyclic siloxane such as octamethyltetracyclosiloxane as a main reactant to polymerization or equilibration reaction. If necessary, an end-capping agent such as hexamethyldisiloxane is added for capping the end with a triorganosilyl group. Examples of silicone oil include dimethylsilicone oil, methylvinylsilicone oil and methylphenylsilicone oil which are end-capped with a trimethylsilyl or vinyldimethylsilyl group, and the foregoing oils which are not end-capped (i.e., terminated with a silanol group).

The life (or deactivation) of the sulfonated resin catalyst can be ascertained by measuring the viscosity or volatile content of the silicone oil obtained therefrom.

If the activity of the sulfonated resin catalyst has lowered, the polymerized oil does not reach the equilibrium composition of reaction, with an increase of the unreacted reactant. Since the reactant is more volatile than the product, the unreacted reactant composition can be estimated by measuring the volatile content in the polymerized oil, from which a lowering of catalyst activity is ascertainable. The volatile content can be determined by holding the oil in a thermostat chamber at 150 to 200° C. for a certain time and measuring a weight loss before and after the holding.

Since an increase of the unreacted reactant lowers the viscosity of the polymerized oil, measurement of the viscosity of the polymerized oil is also an effective means for ascertaining a lowering of catalyst activity.

In a first step of the method of the invention, the sulfonated resin catalyst which has been used in the polymerization of silicone oil whereby the activity has been lowered is washed on the surface with a low molecular weight siloxane medium.

For washing of the catalyst surface, an ordinary solvent inclusive of water is foreign matter within a large continuous apparatus and the use thereof should be avoided to the utmost. Since the low molecular weight siloxane medium is one of reactants for silicone oil preparation and belongs to the same family as silicone oils, it is best suited for dissolving and washing away foreign matter. Additionally, it can be volatilized off due to a low boiling point.

Any low molecular weight siloxane medium having a boiling point may be used herein. Preferred siloxane media are linear methylsiloxane oligomers having 2 to 5 silicon atoms. Of these, hexamethyldisiloxane (HMDS, b.p. 100° C.) and octamethyltrisiloxane (OMTS, b.p. 153° C.) are more preferred because of their boiling point and dissolving power, with HMDS being most preferred.

It is noted that trimers and tetramers of low molecular weight cyclic siloxane are similar in dissolving power and boiling point range, but can undergo polymerization under the action of the acid catalyst in the presence of water and thicken to a gum-like state.

For washing of the catalyst, the low molecular weight siloxane medium is preferably used in an amount of 1 to 100 parts by weight, more preferably 1 to 20 parts by weight per part by weight of the sulfonated resin catalyst. Too small an amount of low molecular weight siloxane medium may fail to achieve sufficient washing whereas too large an amount may be uneconomical.

The technique of washing the catalyst with the low molecular weight siloxane medium involves batchwise agitation within a tank, passing the siloxane medium through a fixed layer into which the catalyst is packed, in a circulatory manner, and the like. An appropriate washing technique may be selected depending on the use state of the catalyst.

After the catalyst is washed with the low molecular weight siloxane medium, the siloxane medium is volatilized off under atmospheric pressure or reduced pressure, and the water content in the catalyst is removed by dehydration and drying.

Since the sulfonated resin catalyst starts degradation at 100° C., the volatilization and dehydrating/drying step is desirably performed at a temperature below 100° C., especially 60 to 80° C. The volatilization and dehydrating/drying step may be carried out in a conventional manner by applying a vacuum or blowing dry air or dry nitrogen gas. The volatilization and dehydrating/drying step can be performed under either atmospheric pressure or reduced pressure although the application of reduced pressure is preferred because of a shortened process time.

The sulfonated resin catalyst is dehydrated for reactivation in this way, preferably to a water content of up to 7% by weight, especially up to 5% by weight.

EXAMPLE

Examples of the invention are given below by way of illustration and not by way of limitation.

Example
Relationship of Water Content to Catalysis of Sulfonated Resin Catalyst

An amount of a commercially available catalyst and a silicone oil having an amount of water added were combined, mixed, and kept in contact for a certain time, after which the catalyst was separated by filtration. The water content of the silicone oil before and after contact with the catalyst was measured by Karl Fischer's method, from which the quantity of water adsorbed to the catalyst was determined. It is noted that since the catalyst on purchase had some water adsorbed thereon, it was dried in a vacuum dryer at 0.1 Torr and 80° C. until the catalyst weight became constant. The catalyst having reached a constant weight was assumed to have a water content 0 wt %, and a series of catalysts with a varying water content were prepared therefrom.

A laboratory polymerization reactor in the form of a stainless steel cylinder having an inner diameter of 25 mm equipped with a 150-mesh metal gauze at the bottom was packed with the above-prepared catalyst having a varying water content of 0 to 9.8 wt % as a fixed bed having a height of 300 mm. A raw material of 1.4 parts by weight of HMDS and 100 parts by weight of dimethyl cyclics (a mixture based on trimers to pentamers of cyclic dimethylpolysiloxane) was passed through the fixed bed at 80° C. and a flow velocity of 2.5 m/h, yielding a trimethylsilyl-terminated dimethylsilicone oil.

Samples were taken from the product at the outlet of the fixed bed, and the volatile content and the viscosity at 25° C. of the reacted solution were measured. The volatile content was determined by holding the reacted solution in a thermostat dryer at 150° C. for 3 hours and determining a weight change before and after the holding.

The results are shown in Table 1.

TABLE 1

| Water content in catalyst (wt %) | Volatile content (wt %) | Viscosity (cs) |
|---|---|---|
| 0 | 11.8 | 198.9 |
| 2.4 | 11.5 | 201.1 |
| 4.8 | 12.0 | 197.5 |
| 7.2 | 15.4 | 174.2 |
| 9.8 | 19.2 | 149.0 |

As seen from Table 1, the amount of volatiles produced increases at a water content of 7.2 wt % or greater, indicating that the reaction has not reached equilibrium. It is concluded that a water content of 7 wt % or lower is appropriate.

Catalyst Reactivation Test

A laboratory polymerization reactor in the form of a stainless steel cylinder having an inner diameter of 80 mm equipped with a 150-mesh metal gauze at the bottom was packed with a solid acid (sulfonated resin) catalyst CT-169 having a water content of 5 wt % as a fixed bed having a height of 600 mm. A raw material of 0.85 part by weight of HMDS and 100 parts by weight of dimethyl cyclics was passed through the fixed bed at 80° C. and a flow velocity of 2.5 m/h to continuously produce a trimethylsilyl-terminated dimethylsilicone oil. After a continuous run over about 900 hours, the catalyst lowered its activity. Thus the catalyst in the fixed bed was withdrawn and subjected to any of the following treatments.

Treatment 1:
  10 parts by weight of the catalyst was combined with 100 parts by weight of HMDS and agitated for 2 hours at room temperature, after which the catalyst was separated by filtration.

Treatment 2:
  Without washing, the catalyst was dried for 5 hours in a vacuum dryer at 80° C. and below 1 Torr.

Treatment 3:
  10 parts by weight of the catalyst was combined with 100 parts by weight of HMDS and agitated for 2 hours at room temperature, after which the catalyst was dried for 5 hours in a vacuum dryer at 80° C. and below 1 Torr.

To a raw material mixture of 0.85 part by weight of HMDS and 100 parts by weight of dimethyl cyclics, the catalyst treated by any of Treatments 1 to 3, a fresh catalyst (CT-169), or a used catalyst after 900 hours of reaction was added in an amount of 1 wt %. Reaction was conducted at 80° C. to produce a trimethylsilyl-terminated dimethylsilicone oil. Samples were taken out of the reaction solution at time intervals and measured for a volatile content for confirming the progress of reaction. The results are shown in Table 2.

TABLE 2

| | Volatile content (wt %) | | | | |
|---|---|---|---|---|---|
| Reaction time (hr) | Fresh catalyst (CT-169) | 900 hr used catalyst | Catalyst reactivated by Treatment 1 | Catalyst reactivated by Treatment 2 | Catalyst reactivated by Treatment 3 |
| 0 | 100.0 | 100.0 | 98.3 | 100.0 | 100.0 |
| 0.5 | 80.4 | 75.5 | 81.3 | 80.3 | 81.5 |
| 1 | 64.8 | 63.9 | 69.2 | 65.3 | 65.2 |
| 2 | 43.7 | 51.1 | 51.7 | 48.2 | 44.2 |
| 4 | 24.9 | 30.4 | 30.8 | 28.2 | 25.3 |
| 6 | 16.1 | 20.6 | 20.4 | 18.2 | 15.6 |
| 8 | 13.0 | 16.1 | 15.6 | 14.5 | 13.1 |

*All the sample solutions whose volatile content was measured had a viscosity in the range of 1,000 ± 5 cs.

As seen from Table 2, a comparison among Treatment 1 (HMDS washing), Treatment 2 (dehydrating/drying) and Treatment 3 (combination of washing and dehydrating/drying) reveals that the catalyst treated by a combination of washing and dehydrating/drying has restored an equivalent activity to the fresh catalyst.

Catalyst Reactivation Test (Line Test 1)

FIG. 1 illustrates a continuous polymerization system with which a test was carried out. Two polymerization towers each in the form of a stainless steel cylinder having an inner diameter of 80 mm equipped with a 150-mesh metal gauze at the bottom were packed with a fresh solid acid catalyst (sulfonated resin, dried to a water content 0 wt %) as fixed beds 3 and 3' having a height of 600 mm. A raw material of 0.85 part by weight of HMDS and 100 parts by weight of dimethyl cyclics in a feed section 1 was continuously passed over 1,400 hours through the first and second towers, with a residence time of 10 minutes in each of fixed beds 3 and 3', while heating to a temperature of 80° C. by pre-heaters 2 and 2'. The output was cooled in a cooler 4, yielding a trimethylsilyl-terminated dimethylsilicone oil which was collected in a reservoir 5. Note that the pre-heaters 2 and 2' use steam 2a and 2a' for heating and the cooler 4 uses cool water 4a for cooling.

Thereafter, HMDS at room temperature was passed through the fixed beds 3 and 3' of sulfonated resin catalyst in the first and second towers at a flow velocity of 100 m/h. The flow of HMDS was continued for 4 hours. The polymerization towers were then heated at 80° C. by flowing hot water through a jacket (not shown) and evacuated below 1 Torr by a vacuum pump. This operation was continued for 3 hours whereby the solid acid catalyst was dried. The catalyst immediately after the reactivation treatment had a water content of 2 wt %.

Thereafter, a raw material of the same composition was passed again under the same conditions over 1,200 hours, yielding a trimethylsilyl-terminated dimethylsilicone oil.

During passage, samples were taken out of the reaction solution at time intervals and measured for a volatile content for confirming the progress of reaction. The results are shown in Table 3.

TABLE 3

| | Volatile content (wt %) | | | |
|---|---|---|---|---|
| Reaction time (hr) | Fresh catalyst in 1st tower | Fresh catalyst in 2nd tower | Reactivated catalyst in 1st tower | Reactivated catalyst in 2nd tower |
| 0 | 13.5 | 13.0 | 13.4 | 13.0 |
| 200 | 13.6 | 13.0 | 13.4 | 13.0 |
| 400 | 15.7 | 13.0 | 16.1 | 13.0 |
| 600 | 16.1 | 13.0 | 16.5 | 13.0 |
| 800 | 17.3 | 13.0 | 20.1 | 13.0 |
| 1000 | 21.5 | 13.1 | 20.5 | 13.0 |
| 1200 | 20.4 | 13.0 | 22.2 | 13.0 |
| 1400 | 20.5 | 13.0 | — | — |

*All the sample solutions whose volatile content was measured had a viscosity in the range of 1.000 ± 5 cs.

It is seen that the reactivated catalysts are fully effective.

Catalyst Reactivation Test (Line Test 2)

A test was carried out with a continuous polymerization system as shown in FIG. 1. Two polymerization towers each in the form of a stainless steel cylinder having an inner diameter of 80 mm equipped with a 150-mesh metal gauze at the bottom were packed with a fresh sulfonated resin catalyst (water content 7 wt %) as fixed beds 3 and 3' having a height of 600 mm. A raw material of 0.85 part by weight of HMDS and 100 parts by weight of dimethyl cyclics in the feed section 1 was continuously passed through the fixed beds 3 and 3' at a flow velocity of 2.5 m/h while heating to a temperature of 80° C. by the pre-heaters 2 and 2'. The output was cooled in the cooler 4, yielding a trimethylsilyl-terminated dimethylsilicone oil which was collected in the reservoir 5. Samples were taken out at the outlets of the first and second fixed bed towers and at time intervals, and measured for a volatile content for confirming the progress of reaction. The volatile content was determined by holding the silicone oil in a thermostat dryer at 150° C. for 3 hours and determining a weight change before and after the holding.

Since the volatile content at the outlet of the first tower continuously lowered with the lapse of reaction time, the run was interrupted after 500 hours. Then the fixed bed towers were heated at 60° C. and evacuated to 2 Torr by a vacuum pump, and kept in this state for 5 hours (this operation is referred to as vacuum treatment). After the vacuum treatment, the run was restarted and continued for a further 100 hours, at which point of time the run was interrupted again. HMDS was passed through the fixed beds at a superficial velocity of 50 m/h for 5 hours. Thereafter, the fixed bed towers were heated at 60° C. and evacuated to 2 Torr by a vacuum pump, and kept in this state for 5 hours (this operation is referred to as combined treatment). After the combined treatment, the run was restarted and continued to a total of 900 hours. The results are shown in Table 4.

TABLE 4

| Reaction time | Volatile content (wt %) | |
|---|---|---|
| (hr) | 1st tower | 2nd tower |
| 0 | 21.0 | 13.0 |
| 200 | 27.8 | 13.0 |
| 400 | 35.4 | 13.0 |
| 500 | 45.3 | 13.3 |
| 500*[1] | 40.2 | 13.0 |
| 600 | 47.3 | 15.1 |
| 600*[2] | 29.8 | 13.0 |
| 800 | 33.7 | 13.0 |
| 900 | 38.3 | 13.1 |

*[1]Vacuum treatment: dehydrating
*[2]Combined treatment: HMDS washing + dehydrating
Note that all the sample solutions whose volatile content was measured had a viscosity in the range of 1,000 ± 5 cs.

As seen from Table 4, the dehydrating treatment conducted alone is insufficient to reactivate the catalyst, but the HMDS washing combined with dehydrating treatment achieves the satisfactory reactivating effect.

Determination of Gel Content in Deactivated Catalyst

In the continuous system shown in FIG. 1, a trimethylsilyl-terminated dimethylsilicone oil having a viscosity of 1,000 cs was continuously produced over 900 hours. To 10 parts by weight of the catalyst which had lowered its activity as a result of continuous use, 10 parts by weight of HMDS was added. The mixture was agitated at room temperature. After the treatment, the catalyst was separated by filtration and the filtrate was measured for T units by NMR analysis. A fresh catalyst was similarly evaluated. Additionally, to examine the clogging of pores on the catalyst surface which had an influence on the catalyst activity, the acid value of a fresh catalyst, a deactivated catalyst (after 900 hours of use) and a catalyst which was washed after deactivation was measured. The results are shown in Table 5.

TABLE 5

| Catalyst | Fresh CT-169 dry | CT-169 dry after 900 hr use | CT-169 dry after washing |
|---|---|---|---|
| T unit[1] | ND | trace | — |
| Acid value[2] (mol/kg) | 5.13 | 4.85 | 5.11 |

[1]After washing, HMDS was analyzed by NMR to confirm the presence of a peak attributable to T unit.
[2]Acid value was measured by adding an excess amount of NaOH to the resin catalyst, and back titrating with HCl.

For the deactivated catalyst after 900 hours use, T units which were not found in the fresh catalyst were detected and a lowering of acid value was found. It is thus presumed that pores on the catalyst surface are clogged, in part, with gel-like substance and contaminants. The catalyst subjected to washing after deactivation had an equivalent acid value to the fresh catalyst, indicating that the gel-like substance and contaminants with which pores on the catalyst surface had been clogged were removed by the washing treatment.

The method of the present invention permits consistent reactivation and hence, repeated use of a sulfonated resin catalyst. While the catalyst replacement requires more time and material, the invention achieves an improvement in productivity from these standpoints and a substantial reduction of waste.

What is claimed is:

1. A method for reactivating a sulfonated resin catalyst which has been used in the polymerization of silicone oil whereby the activity has been lowered, comprising the steps of:

washing the used catalyst with a low molecular weight siloxane medium, volatilizing off the siloxane medium under atmospheric or reduced pressure, and removing water from the catalyst.

2. The method of claim 1 wherein the reactivated resin catalyst has a water content of up to 7% by weight.

3. The method of claim 1 wherein the low molecular weight siloxane medium is hexamethyldisiloxane or octamethyltrisiloxane or both.

4. The method of claim 1 wherein the volatilizing off of the siloxane medium occurs under reduced pressure.

5. The method of claim 1 wherein the water is removed by vacuum, blowing dry air or dry nitrogen gas.

* * * * *